Jan. 17, 1961 L. N. KERN 2,968,372
INTERNAL BLEEDER FOR VEHICLE BRAKE
Filed Feb. 12, 1958 2 Sheets-Sheet 2
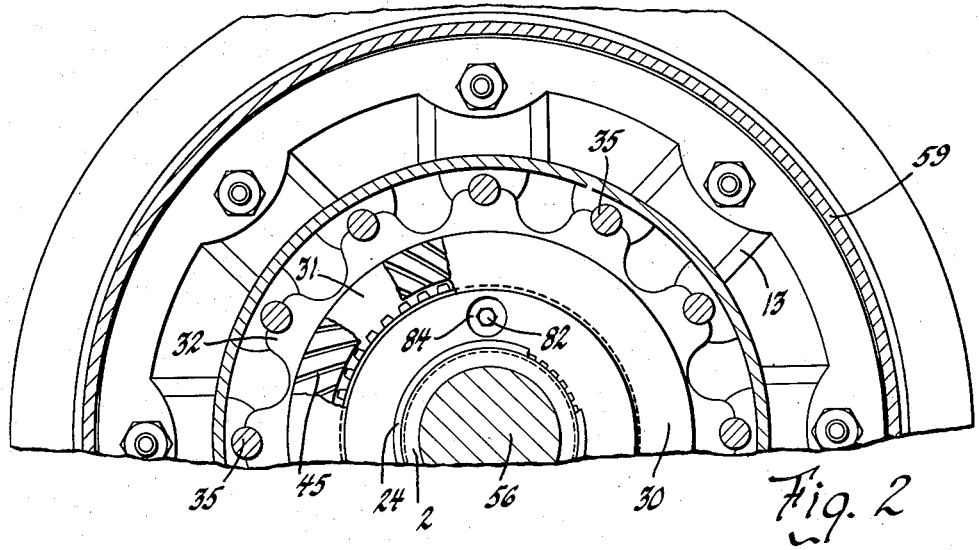
Fig. 2
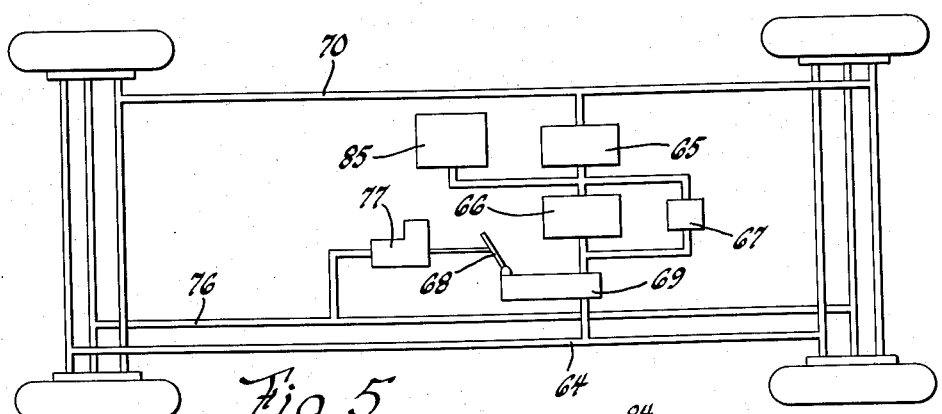
Fig. 5
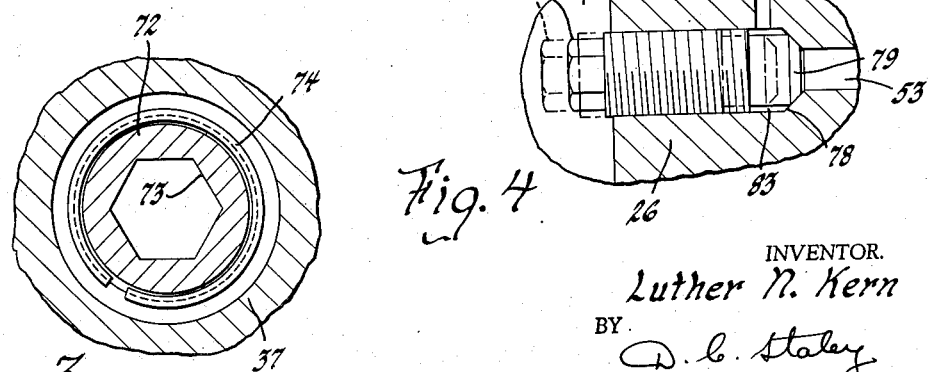
Fig. 4
Fig. 3
INVENTOR.
Luther N. Kern
BY
HIS ATTORNEY United States Patent Office 2,968,372
Patented Jan. 17, 1961

2,968,372
INTERNAL BLEEDER FOR VEHICLE BRAKE

Luther N. Kern, Berkley, Mich., assignor to General Motors Corporation, Detroit, Mich., a corporation of Delaware Filed Feb. 12, 1958, Ser. No. 714,773

6 Claims. (Cl. 188—264)

This invention relates to a hydraulically-operated and hydraulically-cooled vehicle disk brake, and more particularly to an internal bleeder device for this type of a brake.

In operation of a hydraulically-operated and hydraulically-cooled vehicle disk brake it becomes necessary to occasionally bleed the operating fluid from the wheel cylinder. The impurities within the hydraulic cylinder, such as air, may be removed from the cylinder to the outside of the wheel and any fluid may be drained into a suitable container. In the event the fluid is drained onto the floor, it becomes necessary to clean the surrounding area to provide clean working conditions. Where the fluid is drained by means of a tool and a hose, or such suitable means, into a container, it also is necessary that the hose and the tool be cleaned after the operation is completed. It would be much more desirable if the hydraulic fluid could be bled internally into the cooling fluid system.

It is an object of this invention to provide a means for internally bleeding the hydraulic fluid of the brake-operating system into the hydraulic cooling fluid system.

It is another object of this invention to provide a convenient means of bleeding the hydraulic-operating fluid wherein the means for operating the bleeder screw is self-sealing against leakage from either hydraulic system to the atmosphere, and self-locking in the inoperative position.

It is a further object of this invention to provide a bleeder screw valve to control the movement of fluid from the operating fluid system to the cooling fluid system.

These objects are accomplished by means of placing a slidable sleeve which is sealed in its mounting in the brake housing. The inner portion of this slidable sleeve is in contact with the hydraulic fluid of the cooling system. The brake assembly which is mounted within the brake housing has a bleeder screw which is in line with the center line of the slidable sleeve when the brake housing is in proper rotational alignment. The slidable sleeve has a socket on its internal and external end. A socket wrench may be placed in the external socket and then the sleeve pressed inward until the internal socket engages the socket head of a bleeder screw. At this point the brakes which operate the wheel cylinder are then applied. As the bleeder screw is screwed outward, the valve portion on the forward end of the bleeder screw moves away from the valve seat in the stator member. This provides an opening in the passage from the hydraulic-operating fluid to a passage leading to the hydraulic-cooling fluid and thereby permits fluid to pass from one system to the other. When the desired amount of fluid is bled from the operating-fluid system, the bleeder screw is then rotated and the valve portion again engages its cooperating valve seating portion on the stator member. The fluid which contains the impurities such as air, is then in the hydraulic-cooling system. Upon operation of the vehicle motor and brakes, this air within the system is carried to the reservoir where it separates from the hydraulic fluid. As the wrench is retracted from the outer socket of the slidable sleeve and pressure is applied within the hydraulic-cooling system, the slidable sleeve moves outward in its socket. A snap ring carried within the brake housing then drops into a groove in the external periphery of the slidable sleeve and locks the slidable sleeve in this position.

Further objects and advantages of the present invention will be apparent from the following description, reference being had to the accompanying drawings wherein a preferred embodiment of the present invention is clearly shown.

In the drawings:

Fig. 2 is a cross section view shown by line 2—2 of Fig. 1.

Fig. 3 is a cross section view of the slidable sleeve as shown by line 3—3 in Fig. 1.

Fig. 4 is an enlarged cross section view of the valve portion and passages.

Fig. 5 is a view of the hydraulic fluid systems for operating the brakes and cooling the brakes.

Figure 1:
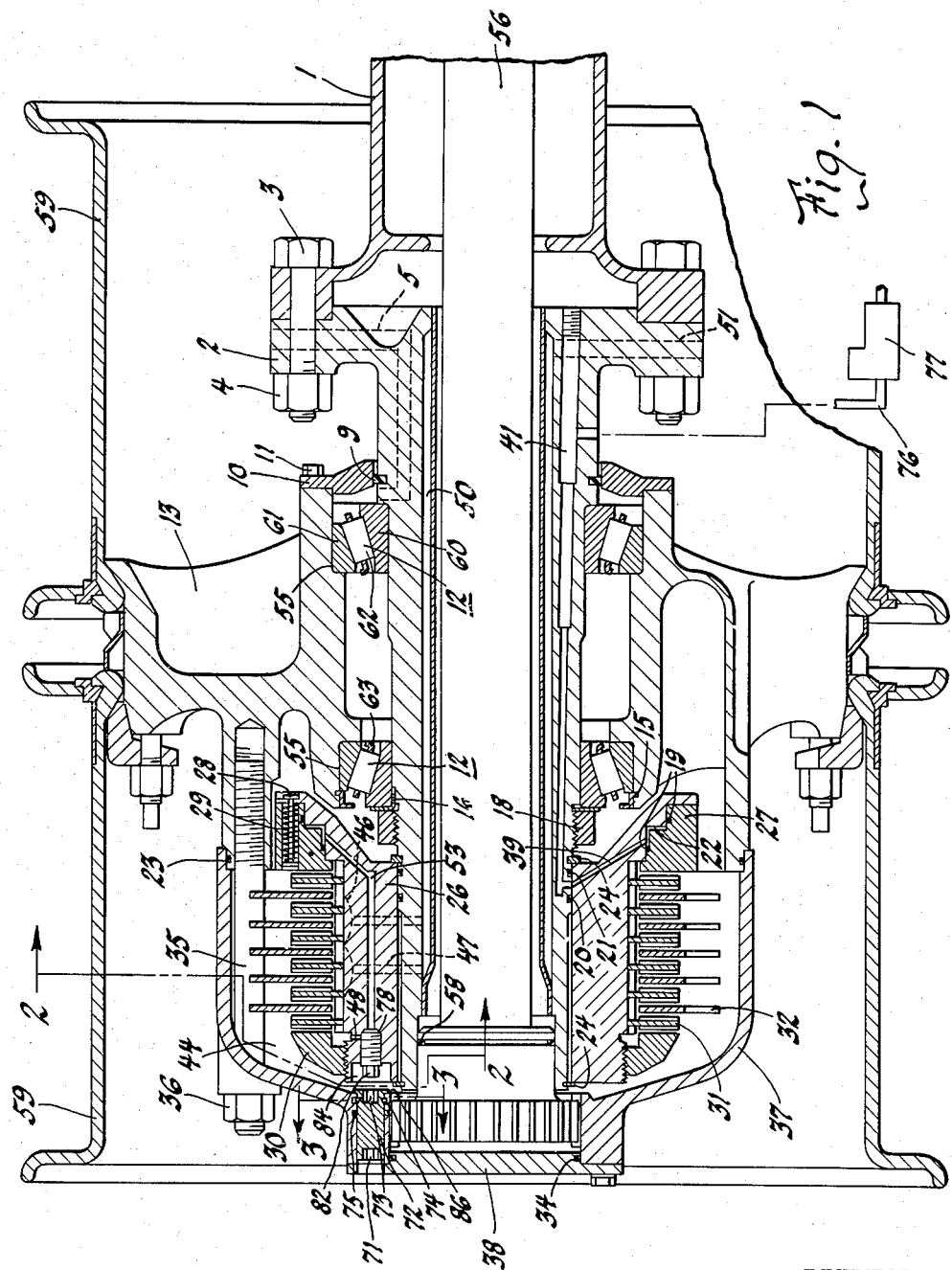
Fig. 1 is a cross section view of the brake assembly and the bleeder screw and slidable sleeve viewed in a direction perpendicular to the center line of the wheel shaft.

Fig. 1 shows the brake assembly with the hydraulic passages within the brake and wheel assembly, and also the bleeder screw and passages connecting both systems. The wheel shaft housing 1 is connected to the shaft housing extension 2 by bolts 3 and nuts 4. An inlet passage is provided within the shaft housing as shown at 5 which connects the inlet cooling hydraulic line 64 to the shaft housing extension 2. A bearing assembly 12 is mounted about the outer periphery of the shaft housing 2. The bearing assembly comprises an inner race 60, an outer race 61, an antifriction element such as a roller 62, and a cage 63. This bearing assembly 12 is mounted within a bearing chamber 55 which is formed between the shaft housing 2 and the hub section of wheel 13, wheel 13 being rotatably mounted about the outer periphery of the bearing assembly 12. Dual rims 59 are shown mounted about the outer periphery of wheel 13. A seal housing 10 is mounted on the inboard portion of the hub section of wheel 13 by means of bolts 11. A seal ring 9 is mounted within the seal housing 10 on the outer periphery of shaft housing extension 2.

A seating ring 16 is mounted on the outboard side of the bearing assembly 12 on the outer periphery of the shaft housing 2. A bearing retainer 15 is also mounted on the outboard side of the bearing assembly 12 on the inner periphery of the hub section of wheel 13. A bearing adjustment member 18 is also provided adjacent to the seating ring 16 which provides adjustment of the tapered roller bearing assembly 12 which is mounted within the bearing chamber 55.

A stator brake disk mounting member 26 is spline-coupled to the shaft housing extension 2. This stator disk mounting member 26 is held in position axially by means of two snap rings 24. The stator disk mounting member 26 is also spline-coupled to the stator disks 31. A pressure disk is shown at 27 which moves axially against the stator disks 31. The movement of the pressure plate is provided by hydraulic fluid within the fluid chamber 22. Fluid chamber 22 is provided with a seal on its inboard and outboard side as shown at 19. A release spring is also shown at 29 which is mounted within the pressure disk 27 on a pin 28. The inboard end of pin 28 is connected to the pressure disk 27. A backing plate 30 is mounted on the outer periphery on the outboard end of the stator disk mounting member 26. This backing plate is also mounted adjacent to the outboard stator disk 31.

Two seals 20 and 21 are also provided about the inner periphery of the stator disk mounting member 26 and the outer periphery of the shaft housing extension 2. A passage from the chamber 22 is shown at 39. This passage in the stator disk mounting member 26 connects the passage 41 and the shaft housing extension between the two seals 20 and 21. A seal 58 is also provided on the shaft 56 and within the inner periphery of shaft housing extension 2.

A passage 53 is also shown within the stator disk mounting member 26 which connects the fluid chamber 22 to a valve seating portion 78. This valve seating portion 78 forms the side of a chamber 83 which connects to passage 48. Passage 48 connects the chamber 83 with the hydraulic cooling fluid system.

Fig. 4 shows a bleeder screw 82 threadedly mounted in the stator disk mounting member with its forward portion extending into chamber 83. The forward end of the bleeder screw has a tapered valve portion 79 which abuts up against a seating portion 78 of the stator disk mounting member 26. The head of screw 82 is recessed in a chamber 84 in the outboard end of stator disk mounting member 26. The axis of the bleeder screw is parallel with the axis of the wheel shaft 56, but radially outward from the center line of the shaft.

A brake housing 37 encloses the brake assembly and is connected to the wheel 13 by means of stud bolts 35 and nuts 36. These stud bolts 35 also provide a mounting for the rotating disks 32 which engage the stator disks 31. A seal 23 is provided on the inboard end on the inner periphery of the brake housing 37 between the hub section of wheel 13. An end plate 38 is mounted on the outboard end of the brake housing 37. This is also provided with a seal 34 between the housing and the end plate.

Figs. 1 and 3 show a slidable sleeve 72 mounted within the end of the brake housing 37. This slidable sleeve is mounted radially outward from the center line of the shaft 56 so that when it is properly rotated it is also axially in line with the bleeder screw 82. The inboard end of the slidable sleeve 72 is provided with a socket 73 for receiving a socket head on bleeder screw 82 when the slidable sleeve is moved inboard. A seal 75 is also mounted in the brake housing about the outer periphery of the slidable sleeve. A snap ring 74 is also mounted in the groove in the bell housing which locks in a mating groove in the outer periphery of the slidable sleeve when the slidable sleeve is in its outboard position. A flange 86 is provided on the inboard end of the slidable sleeve to prevent the sleeve from additional movement axially outward. The outboard end of the slidable sleeve is also provided with a socket 71 for receiving a socket wrench when the bleeder adjustment is desired.

Fig. 4 shows the passage means with the bleeder screw 82 in the closed position. A phantom view is also shown with the bleeder screw in an open position to provide communication between the operating fluid system and the cooling fluid system.

The fluid passage means within the wheel and bearing and brake structure is shown as follows in Fig. 1: Passage 5 connects the fluid transmission line of the cooling system 64 to the bearing chamber 55. The fluid passes through the bearing chamber 55 to the outboard end of the bearing chamber and then through a passage between the stator disk mounting 26 and the hub section of wheel 13 to the outer periphery 44 of the brake disks 31 and 32. This chamber 44 continues about the outboard side of the backing plate 30 adjacent to the brake housing. Fluid also is present between the brake housing 37 at the point where the slidable sleeve 72 is mounted. The fluid pressure at this point forces the slidable sleeve outward after a bleeder adjustment has been made.

The brake discs are cooled by means of small passages 45 on the sides of the brake disks which lead radially inward to a chamber 46. Passages 47 lead radially inward from this point to an axial passage 50 which runs generally parallel to the main shaft through the shaft housing extension 2. This passage leads to passage 51 which connects the return side 70 of the cooling fluid transmission line.

Fig. 5 shows the fluid systems for operating and cooling the brakes. The operating fluid is controlled by a conventional pedal 68 operating a master cylinder 77. When pressure is created in the hydraulic fluid line 76 by master cylinder 77 the pressure is also created in passages 41 and 39 to operate the wheel cylinders.

The cooling fluid system is also controlled by the brake pedal 68 which operates valve 69. Fluid passes from pump 66 through lines 64 into the passage 5 of shaft housing 2. After circulating through the brake, the fluid returns through passage 51 of the brake housing 2 into the return lines 70. The fluid then passes through a cooler 65 to reservoir 85. The fluid flows through a by-pass valve 67 around pump 66 when valve 69 is closed.

The internal brake bleeding device operates in the following manner: A socket wrench is inserted in the socket 71 at the outboard end of the slidable sleeve 72. The brake housing 37 is then rotated until the axis of the slidable sleeve is axially in line with the axis of the bleeder screw 82. The slidable sleeve is then moved inboard by means of the socket wrench in the outboard end of the sleeve until the inboard socket engages the socket head of bleeder screw 82. The slidable sleeve is then rotated thereby rotating the bleeder screw 82 which moves the valve portion 79 away from its mating seat portion 78 on the stator disk mounting member 26. At this time the brake pedal 68 is depressed which, in turn, creates pressure within the brake-operating fluid system. With the bleeder screw 82 and its valve portion 79 in an open position, the fluid from the operating fluid system then passes into the fluid-cooling system through passages 53 and 48.

When the desired amount of fluid has been bled from the fluid-operating system, the wrench is then turned closing the bleeder screw 82 which sets the valve portion 79 against the seating portion 78 of the stator disk mounting member 26. By means of this device, fluid is never allowed to escape from the two systems; fluid is merely transferred from the operating-fluid system to the cooling-fluid system. As the bleeder screw is closed, further passage from one system to the other is blocked. Upon retracting the wrench from the socket on the outboard end of the slidable sleeve 72, the slidable sleeve will then move outward when pressure is applied within the hydraulic-cooling system.

While the embodiment of the present invention as herein disclosed constitutes a preferred form, it is to be understood that other forms might be adopted.

What is claimed is as follows:

1. A hydraulic brake including a bleeder device and comprising in combination; a brake assembly, fluid passage means within said brake assembly for brake-operating fluid, fluid passage means within said brake assembly for brake-cooling fluid, a bleeder screw with a valve portion on its forward end within said brake assembly, a valve seat cooperating with said valve portion, fluid passage means connecting the forward end of said valve seat with said operating-fluid passage means, fluid passage means connecting said cooling-fluid passage means with the rearward end of said valve seat, means for opening and closing said valve to provide a fluid connection from the operating-fluid passage means to the cooling-fluid passage means.

2. A hydraulic brake including a bleeder device comprising in combination; a hydraulic brake, a brake housing, a slidable sleeve within said housing, means for providing rotative and axial movement of said slidable sleeve, a socket on the inner end of said slidable sleeve, a bleeder screw with a socket head adapted for engaging the socket for said slidable sleeve, a stator member receiving said bleeder screw, a beveled portion on the forward portion of said bleeder screw to form a valve, a mating portion on said stator member to form a seat, fluid passage means within said brake for brake-operating fluid, fluid passage means within said brake for brake-cooling fluid, fluid passage means from said operating-fluid passage means to said fluid passage means for brake cooling fluid for receiving said bleeder screw valve, said bleeder screw valve permitting flow of fluid to said one side of said bleeder screw valve from the operating-fluid passage means to the cooling-fluid passage means when said bleeder screw valve is open.

3. A hydraulic brake including a bleeder device comprising in combination; a hydraulic brake, a brake housing, a slidable sleeve within said brake housing, a socket on both ends of said slidable sleeve, a seal about the outer periphery of said slidable sleeve, a snap ring on the outer periphery of said slidable sleeve, a flanged portion on the inboard end of said slidable sleeve, a socket head bleeder screw within said hydraulic brake for engaging the socket on the inboard end of said slidable sleeve, fluid-passage means within said brake for brake-operating fluid, fluid-passage means within said brake for brake-cooling fluid, connecting passage means between said brake-operating fluid passage means and said cooling fluid passage means, a valve within said connecting passage means on the inboard end of said bleeder screw to provide communication from said brake-operating fluid passage means to said brake-cooling fluid passage means when said valve is open.

4. A hydraulic brake including a bleeder device comprising in combination; a hydraulic brake, fluid passage means within said brake for brake-operating fluid, fluid passage means within said brake for brake-cooling fluid, connecting passage means within said brake between said operating fluid passage means and said brake cooling fluid passage means, a tapered end of a bleeder screw mounted within said connecting-passage means, a tapered mating portion forming a wall in said connecting-passage means, means for operating said bleeder screw to provide internal bleeding means for bleeding the brake operating fluid into said brake-cooling fluid passage means.

5. A hydraulic brake including a bleeder device comprising in combination; a hydraulic brake, a brake housing, a sleeve mounted in said housing having a female socket on the internal and the external ends, said external female socket adapted for control by external means having a male head, fluid passage means within said brake for brake-operating fluid, fluid passage means within said brake for brake-cooling fluid, connecting passage means within said brake between said operating fluid passage means and said brake cooling-fluid passage, valve means having a male head for operation by said internal female socket of said sleeve, said valve means controlling fluid movement in said connecting passage between said brake cooling passage means and said brake operating fluid passage means.

6. A hydraulic brake including a bleeder device comprising in combination, a hydraulic brake, a brake housing, a slidable sleeve within said housing, means for providing rotative and axial movement of said slidable sleeve, a socket on the outboard and the inboard ends of said slidable sleeve, a bleeder screw with a socket head adapted for engaging said inboard socket of said slidable sleeve, stator member receiving said bleeder screw, a beveled portion on the forward end of said bleeder screw to form a valve, a mating portion on said stator member to form a valve seat, fluid passage means within said brake for brake-operating fluid, fluid passage means within said brake for brake cooling fluid, a connecting-fluid passage means within said brake for connecting said fluid-operating passage means to said fluid-cooling passage means, said valve mounted within said connecting-passage means to provide bleeding of fluid from said operating-fluid passage means to said cooling-fluid passage means when said valve is open.

References Cited in the file of this patent

UNITED STATES PATENTS

| | | |
|---|---|---|
| 2,502,050 | Kattner | Mar. 28, 1950 |
| 2,788,870 | Heck | Apr. 16, 1957 |
| 2,835,357 | Kelley et al. | May 20, 1958 |

FOREIGN PATENTS

| | | |
|---|---|---|
| 1,001,791 | France | Oct. 24, 1951 |
| 695,582 | Germany | Aug. 28, 1940 |
| 556,158 | Great Britain | Sept. 22, 1943 |